United States Patent
Reed et al.

(10) Patent No.: US 6,807,740 B2
(45) Date of Patent: Oct. 26, 2004

(54) LASER ALIGNMENT TOOL

(75) Inventors: Paul W. Reed, Everett, WA (US); Duncan P. Mackinnon, Woodinville, WA (US); Ronald D. Curl, Lynnwood, WA (US); Joe R. Long, Goodyear, AZ (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/325,401

(22) Filed: Dec. 20, 2002

(65) Prior Publication Data

US 2004/0117995 A1 Jun. 24, 2004

(51) Int. Cl.⁷ .............................................. G01B 11/26
(52) U.S. Cl. ....................... 33/286; 33/293; 33/DIG. 21
(58) Field of Search .......................... 33/286, 290, 293, 33/295, 285, 289, DIG. 21

(56) References Cited

U.S. PATENT DOCUMENTS

| | | | |
|---|---|---|---|
| 3,778,169 A | * 12/1973 | Adams | 33/293 |
| 3,792,535 A | * 2/1974 | Marshall et al. | 434/22 |
| 3,819,273 A | * 6/1974 | Unema et al. | 33/293 |
| 3,857,639 A | * 12/1974 | Mason | 33/290 |
| 4,349,838 A | * 9/1982 | Daniel | 33/286 |
| 4,488,050 A | * 12/1984 | Iwafune | 33/293 |
| 4,693,598 A | * 9/1987 | Sehr | 33/293 |
| 5,003,548 A | * 3/1991 | Bour et al. | 372/44 |
| 5,734,466 A | * 3/1998 | George et al. | 356/138 |
| 5,983,511 A | * 11/1999 | Osaragi et al. | 33/293 |
| 6,033,787 A | * 3/2000 | Nagase et al. | 228/121 |
| 6,195,902 B1 | * 3/2001 | Jan et al. | 33/286 |
| 6,322,365 B1 | * 11/2001 | Shechter et al. | 434/21 |
| 6,450,816 B1 | * 9/2002 | Gerber | 434/11 |
| 6,473,980 B2 | * 11/2002 | Ripingill et al. | 33/286 |
| 6,572,375 B2 | * 6/2003 | Shechter et al. | 434/19 |
| 6,588,115 B1 | * 7/2003 | Dong | 33/DIG. 21 |
| 6,616,452 B2 | * 9/2003 | Clark et al. | 434/19 |
| 6,622,390 B2 | * 9/2003 | Brusius | 33/286 |

\* cited by examiner

Primary Examiner—G. Bradley Bennett
(74) Attorney, Agent, or Firm—Shimokaji & Associates, P.C.

(57) ABSTRACT

A laser alignment tool includes a line laser assembly including a laser and emitting a laser beam line and an electronic target assembly including a photo detector array. The laser beam line of the laser is pointed toward the center of the photo detector array with the longitudinal axis of the laser beam line being perpendicular to the centerline of the photo detector array. The line laser assembly includes a laser diode having a line-generating lens attached in front using a lens holder and being mounted onto a tilt stage. Using a line laser provides a certified accuracy of +/−0.005 inches at a distance of 10 feet. The electronic target further includes a narrow band pass filter and a discrete LED display that is controlled by a microprocessor. The microprocessor may be programmed with a variable range for each LED of the discrete LED display according to the alignment task.

42 Claims, 4 Drawing Sheets

LASER ALIGNMENT TOOL

BACKGROUND OF THE INVENTION

The present invention generally relates to laser-based optical systems and methods for laser-based measurement and alignment and, more particularly, to a laser alignment tool including a low-power, line laser and a one-dimensional electronic target, and a method for laser alignment.

Laser alignment and measurement are standard techniques in industrial maintenance and operation. In general, a laser is used for alignment by making it parallel to reference points and using a target to measure deviations from those points. Precision laser alignment tools can be used for maintenance, repair, quality control, and the like in virtually any industry. Commercial products are available for a variety of alignment and measurement tasks in industries such as aerospace, automotive, power generation, shipbuilding, steel manufacturing, and numerous others. Especially, the manufacture of aircraft presents many challenges in the field of laser alignment.

Companies like Hamar Laser, Pinpoint Laser Systems, and Pro Shot, Inc., have developed wireless target technologies that rid the aircraft of cables, allowing tasks to be performed without the burden of wires cluttering the work area, easing setup and operating tasks. Still, laser-based optical systems for measurement and alignment that are available on the commercial market for use in the aerospace industry are relatively large, complicated and expensive.

Further, commercially available laser alignment tools used in the aerospace industry use a point laser or a rotating point laser as an aiming laser or transmitter. Since the round spot of a point laser may or may not have a Gaussian profile, variations in readings and errors may occur. Also, the rotating laser design is relatively complicated because of the rotating parts. Therefore, these components are prone to failure.

Commercially available laser alignment tools used in the aerospace industry typically comprise a laser receiver, which features a digital display. The digital displays are often difficult to discern from a distance, and not optimized to indicate whether or not an alignment is in or out of design tolerance. A laser receiver manufactured by Pro Shot, Inc. provides an LED display on its backside and audio tones in addition to an LCD front panel. This laser receiver works with a Pro Shot laser transmitter, and most other brands of rotating lasers on the market. The LED display of the Pro Shot laser receiver provides five channels of information: high, high fine, on grade, low fine, and low, as needed for an electronic level. Since the LED display is not programmable, only tolerances for one grading/leveling application can be displayed. Further, the LED display cannot be physically modified and is, therefore, limited to a given application. Although the user can select between three operating accuracies—ultra-fine, standard, and coarse—the Pro Shot laser assembly does not reach the accuracy that is needed for certain applications in the aerospace industry.

There has, therefore, arisen a need for the development of a laser alignment tool that is suitable for specific alignment tasks in the aerospace industry, such as the centering of an airplane rudder during the actuator shimming process, but is flexible enough to be used for a variety of alignment tasks in various industries. There has also arisen a need to modify the aiming laser to avoid the disadvantages of a point or rotating point laser. There has further arisen a need to modify the laser receiver or electronic target to make it more visible from the distance and adjustable to different alignment tasks as needed. There has still further arisen a need for a laser alignment tool that is compact and lightweight to avoid possible damage to the aircraft or personal injuries and for easy handling.

As can be seen, there is a need for a laser alignment tool suitable for specific alignment tasks in the aerospace industry and for a method for laser alignment having a very high measurement accuracy and reliability. Also, there is a need for a laser alignment tool that is compact, light weight and portable, and that is relatively inexpensive. Moreover, there is a need for a modified laser assembly to be paired with an electronic target that can be adjusted to different alignment tasks.

SUMMARY OF THE INVENTION

The present invention provides a laser alignment tool suitable for, but not limited to, specific alignments tasks in the aerospace industry. The present invention also provides a method for laser alignment having a very high measurement accuracy and reliability. The present invention further provides a laser alignment tool that is compact, lightweight, and portable, and that is relatively inexpensive. Moreover, the present invention provides a line laser assembly to be paired with an electronic target that can be adjusted to different alignment tasks.

In one aspect of the present invention, a laser alignment tool comprises a line laser assembly including a laser for emitting a laser beam line; and an electronic target assembly including a photo detector array. The laser beam line of the laser is pointed toward a center of the photo detector array with a longitudinal axis of the laser beam line being perpendicular to the centerline of the photo detector array.

In another aspect of the present invention, a laser alignment tool includes a line laser assembly positioned inside a rigid enclosure mounted to a reference location, and an electronic target assembly having a target housing mounted to a part to be aligned.

In still another aspect of the present invention, a line laser assembly includes a tilt stage, a laser diode mounted onto the tilt stage, a line-generating lens, and a lens holder positioning the line-generating lens in front of the laser diode.

In yet another aspect of the present invention, an electronic target includes a visual indication panel having an aperture and including a discrete LED display, a photo detector array, a narrow band pass filter positioned between the aperture of the visual indication panel and the photo detector array, and a programmable microprocessor.

In a further aspect of the present invention, a method of laser alignment includes the steps of: providing a laser alignment tool including a line laser assembly and an electronic target assembly; mounting the line laser assembly to a reference location; programming a microprocessor with a variable range for each LED of a discrete LED display; mounting the electronic target assembly to a part to be aligned; pointing a laser beam line toward the center of a photo detector array with the longitudinal axis of the laser beam line being perpendicular to the centerline of the photo detector array; reading measurement results from the discrete LED display; and aligning the part to required accuracy.

These and other features, aspects and advantages of the present invention will become better understood with reference to the following drawings, description and claims.

DETAILED DESCRIPTION OF THE INVENTION

Figure 1:
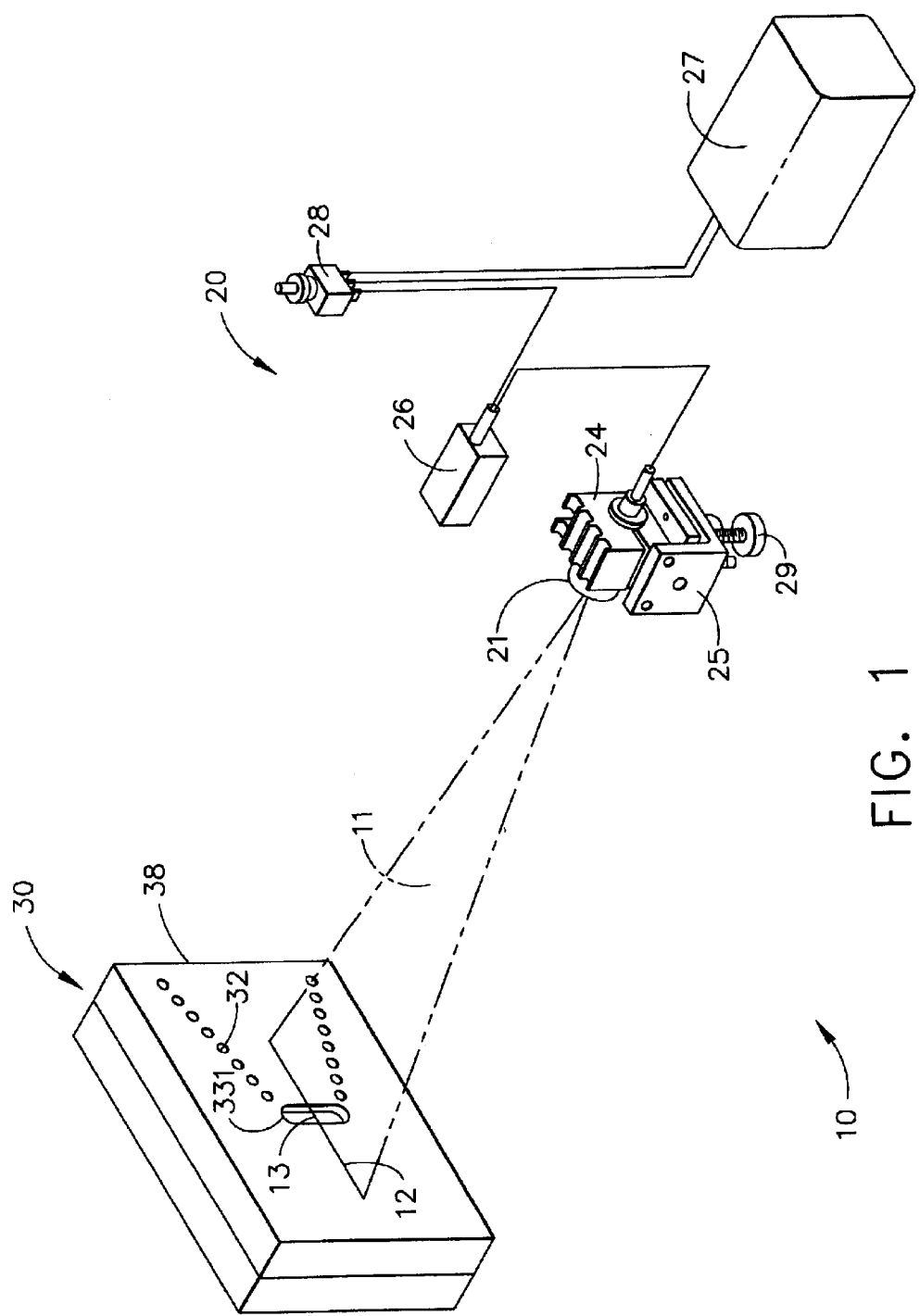
FIG. 1 is a perspective view of a laser alignment tool according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a laser alignment tool suitable for specific alignments tasks, such as in the aerospace industry. The present invention also provides a method for laser alignment having a very high measurement accuracy and reliability as needed for those specific tasks. The laser alignment tool of the present invention may be used, for example, for centering the rudder of an airplane during the actuator shimming process. The laser alignment tool of the present invention includes a low-power, eye safe, and battery operated line laser and a specialized laser receiver featuring an adjustable one-dimensional electronic target. For the alignment of the rudder, the laser is indexed to gage points on the vertical fin, while the electronic target is indexed to the trailing edge of the rudder. Since the electronic target is adjustable, the alignment tool of the present invention may also be used for other alignment tasks within the aerospace industry, such as the alignment of horizontal stabilizers, low skin panels, and antennae attachments of airplanes. It might also be possible to use the alignment tool of the present invention as a device to place stanchions for the cargo area, as well as centering ailerons, and other one-dimensional alignment tasks. Further, the use of the laser alignment tool of the present invention is not limited to the aerospace industry. It might be possible to use the laser alignment tool of the present invention as a tool to keep overhead cranes aligned with a moving production line, for example. Therefore, the highly accurate laser alignment method and the laser alignment tool of the present invention might be used whenever and wherever a one-dimensional alignment task exists.

In one embodiment, the present invention provides a low-power, eye safe, and battery operated line laser. The use of a line laser as an aiming laser has several benefits over the use of a prior art point or rotating point laser. The projection of the plane of light from the line laser improves the side-to-side latitude for the alignment operation. Therefore, the line laser used with the laser alignment tool of the present invention is more accurate, and has a higher reliability and repeatability then a prior art point or rotating point laser. Using a line laser provides a qualified accuracy of +/−0.005 inches at a distance of 1 to 20 feet or more, depending on the application. Further, a line laser features a simple design, avoiding movable parts that may be prone to failures that are associated with the use of prior art rotating point lasers.

In one embodiment, the present invention provides a one-dimensional electronic target as a laser receiver. The electronic target may comprise a visual indication panel including a discrete LED display, and a printed circuit board including a photo detector array and a programmable microprocessor. The discrete LED display of the present invention provides a better visibility from the distance than prior art digital LCDS. Since the discrete LED display is microprocessor controlled, the LEDs may be easily programmed to indicate different engineering tolerances depending on the current alignment task. The visual indication panel may be physically modified, for instance by changing the number of LEDs, or the color of LEDs, to suit the user and the alignment task. By providing a visual display with programmable LEDs and a modifiable appearance, the electronic target of the present invention is adjustable to various one-dimensional alignment tasks.

By providing a low-power, eye safe, and battery operated line laser and a one-dimensional electronic target according to one embodiment of the current invention, the laser alignment tool of the present invention has a simple and compact design, is light weight and portable. Therefore, the laser alignment tool of the present invention is easier to handle and operate, is less likely to cause personal injury or damage to the parts to be aligned, and has a faster job setup and breakdown time than prior art laser alignment tools. Further, the laser alignment tool of the present invention has a higher accuracy. The laser alignment tool of the present invention provides a certified accuracy of +/−0.005 inches at a distance of 10 feet. Also, because of the simple design, the laser alignment tool of the present invention is significantly less expensive than prior art laser alignment tools.

Referring now to FIG. 1, a laser alignment tool 10 is illustrated according to one embodiment of the present invention. The laser alignment tool 10 may include a line laser assembly 20 and an electronic target assembly 30. The line laser assembly 20 may include a low-power laser diode 21, a line-generating lens 22 (shown in FIG. 2), and a lens holder 23 (also shown in FIG. 2), as further described below. The line laser assembly 20 can be mounted to a reference location 50 (not shown). The electronic target assembly 30 may include a photo detector array 31 (shown in FIG. 3), and a discrete LED display 32. The electronic target assembly 30 can be attached to or mounted on the part 60 (not shown) to be aligned.

In use, a laser beam line 11 can be pointed toward the center of the photo detector array 31, with the longitudinal axis 12 of the laser perpendicular to the centerline 311 of the photo detector array 31. As the laser beam line 11 is swept from the top to the bottom of the photo detector array 31, a microprocessor 351 can calculate the position 13 of the laser beam line 11 relative to the longitudinal center of the centerline 311 of the photo detector array 31 and illuminates the corresponding LED in the discrete LED display 32.

Figure 2:
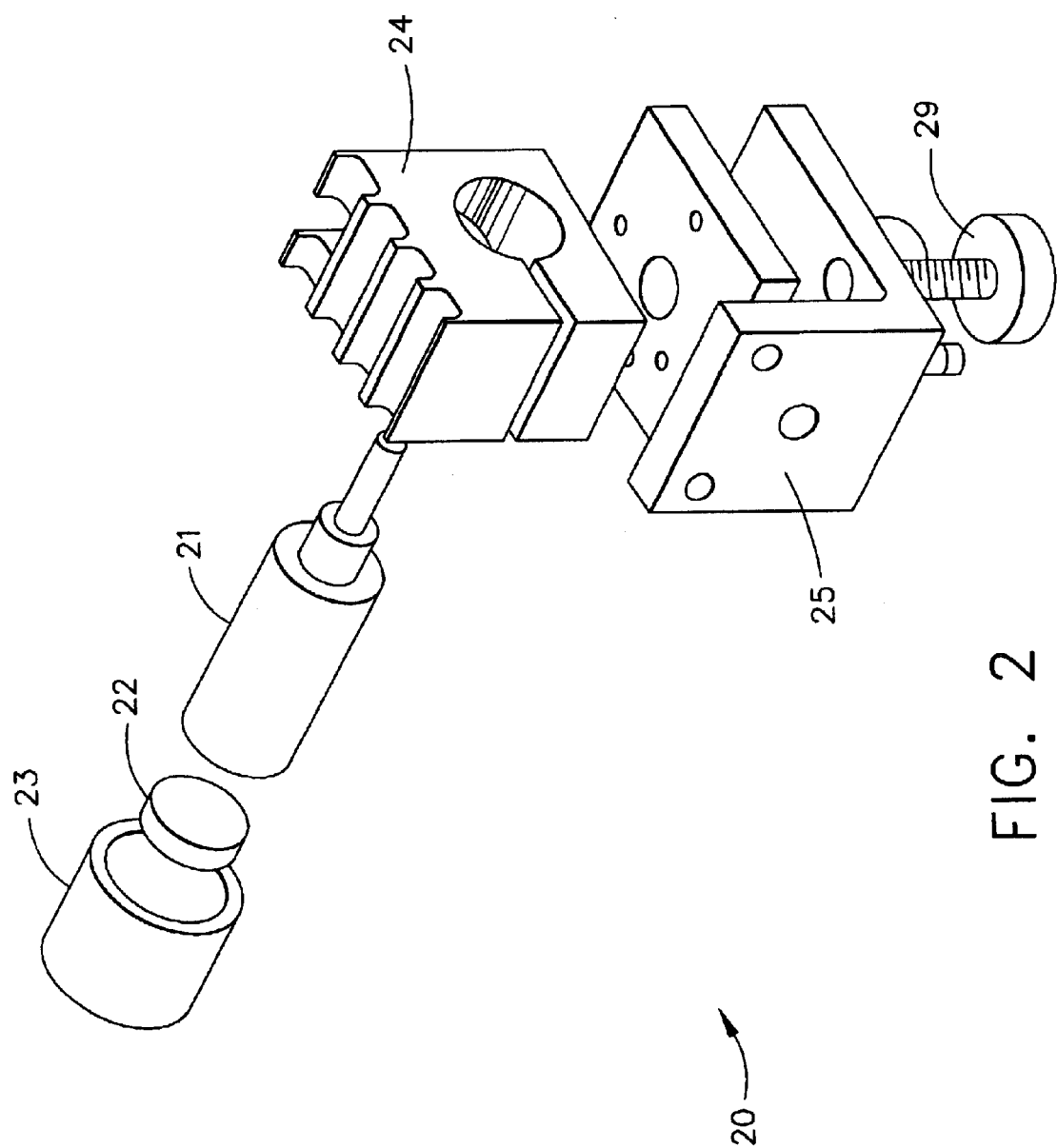
FIG. 2 is an exploded perspective view of a line laser assembly according to one embodiment of the present invention.

Referring now to FIG. 2, a line laser assembly 20 is illustrated according to one embodiment of the present invention. The line laser assembly 20 may include a laser diode 21, a line-generating lens 22, a lens holder 23, a heat sink 24, and a tilt stage 25. The line laser assembly 20 can further include a power supply module 26, a laser battery pack 27, and an on/off toggle switch 28, as shown in FIG. 1. The laser diode 21 can be a low power, class I, II, or IIIa eye safe, battery operated laser. For example, the laser diode 21 may be a 658 nm collimated laser diode. The lens holder 23 can position the line-generating lens 22 in front of the laser diode 21. By using the line-generating lens 22, a line laser can be created that improves the accuracy and repeatability of the measurements in comparison with prior art point lasers.

The laser diode 21 may be fastened to the tilt stage 25 using a heat sink 24. For example, the heat sink 24 may be custom-machined from an aluminum plate. The tilt stage 25 can allow fine adjustments for aiming the laser by using at least two fine threaded adjustment screws 29. In addition, the tilt stage 25 may be mounted onto a translation stage (not shown) to provide additional adjustment capabilities. Power can be supplied to the laser diode 21 from the laser battery pack 27. Power control can be provided by the standard on/off toggle switch 28. The laser battery pack 27 may include four standard 1.5 Volt AA size batteries. The power supply module 26 is typically adjusted and set to limit the laser output to class IIIa or less for safety considerations.

Figure 3:
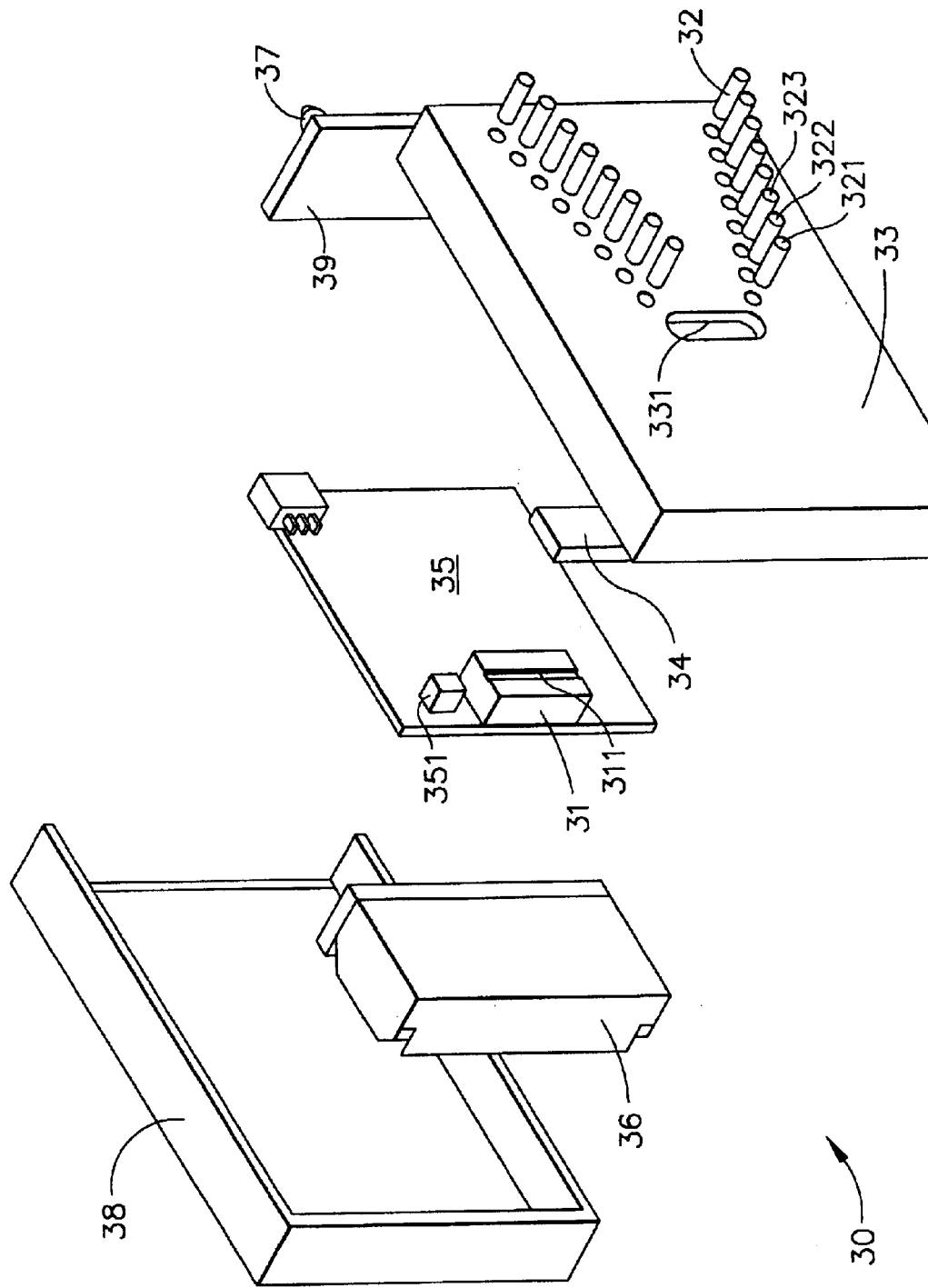
FIG. 3 is an exploded perspective view of an electronic target assembly according to one embodiment of the present invention.

Referring now to FIG. 3, an electronic target assembly 30 is illustrated according to one embodiment of the present invention. The electronic target assembly 30 may include a visual indication panel 33, a narrow band pass filter 34, a photo detector array 31, a printed circuit board 35, a battery pack 36, and a target housing 38. The visual indication panel 33 can further include a discrete LED display 32 and an aperture 331. The narrow band pass filter 34 may be located in between the aperture 331 in the visual indication panel 33 and the photo detector array 31. For example, the narrow band pass filter 34 may be a 650 nm narrow band pass filter. The photo detector array 31 can be mounted onto the printed circuit board 35. The printed circuit board 35 may further include a flash programmable microprocessor 351 and support circuitry. Power may be supplied to the printed circuit board 35 from two standard 1.5 Volt AAA size batteries located in the battery pack 36. The power supply to the printed circuit board 35 may be controlled using the standard on/off toggle switch 37. The narrow band pass filter 34, the printed circuit board 35, and the battery pack 36 may be enclosed by the target housing 38. The target housing 38 is compact and lightweight, but sturdy enough to protect its internal components. The target housing 38 may include a removable sidewall 39 to allow easy access to the internal components. The target housing 38 may be fastened either to a fixed base, a linear positioning stage, or directly to the part 60 being aligned.

The programmable microprocessor 351 mounted onto the printed circuit board 35 makes it possible to change the engineering tolerance levels on the LEDs for different measurement tasks. The microprocessor 351 may be programmed with a variable range for each LED of the discrete LED display 32, corresponding to tolerance bands for the part 60 being aligned. For example, if the laser beam line 11 is above or below, but within 0.005" of the center of the photo detector array 31, the first LED 321 may be lit up; if between 0.005" and 0.015" of center, the second LED 322 may be lit up; if between 0.015" and 0.040" of center, the third LED 323 may be lit up; and so on. In addition, various colored LEDs may be used in the display 32 to further highlight tolerance zones. For example, green LEDs may indicate centered within engineering tolerance, while red LEDs may indicate out or not centered within engineering tolerance.

Further, the LEDs may be arranged on the discrete LED display 32 in various orientations, such as two converging rows indicating when the laser beam line 11 is centered on the photo detector array 31, as shown in FIG. 3. This system is unique since the LEDs are used as a simple interface for communicating variable alignment positions. Audio signals indicating convergence through differing tones may be incorporated as well. In addition, the visual indication panel 33 may be physically modified. For instance, the LEDs may be exchanged for different colored ones, or the number of LEDs may be increased or decreased to suit the user and the specific alignment task.

Figure 4:
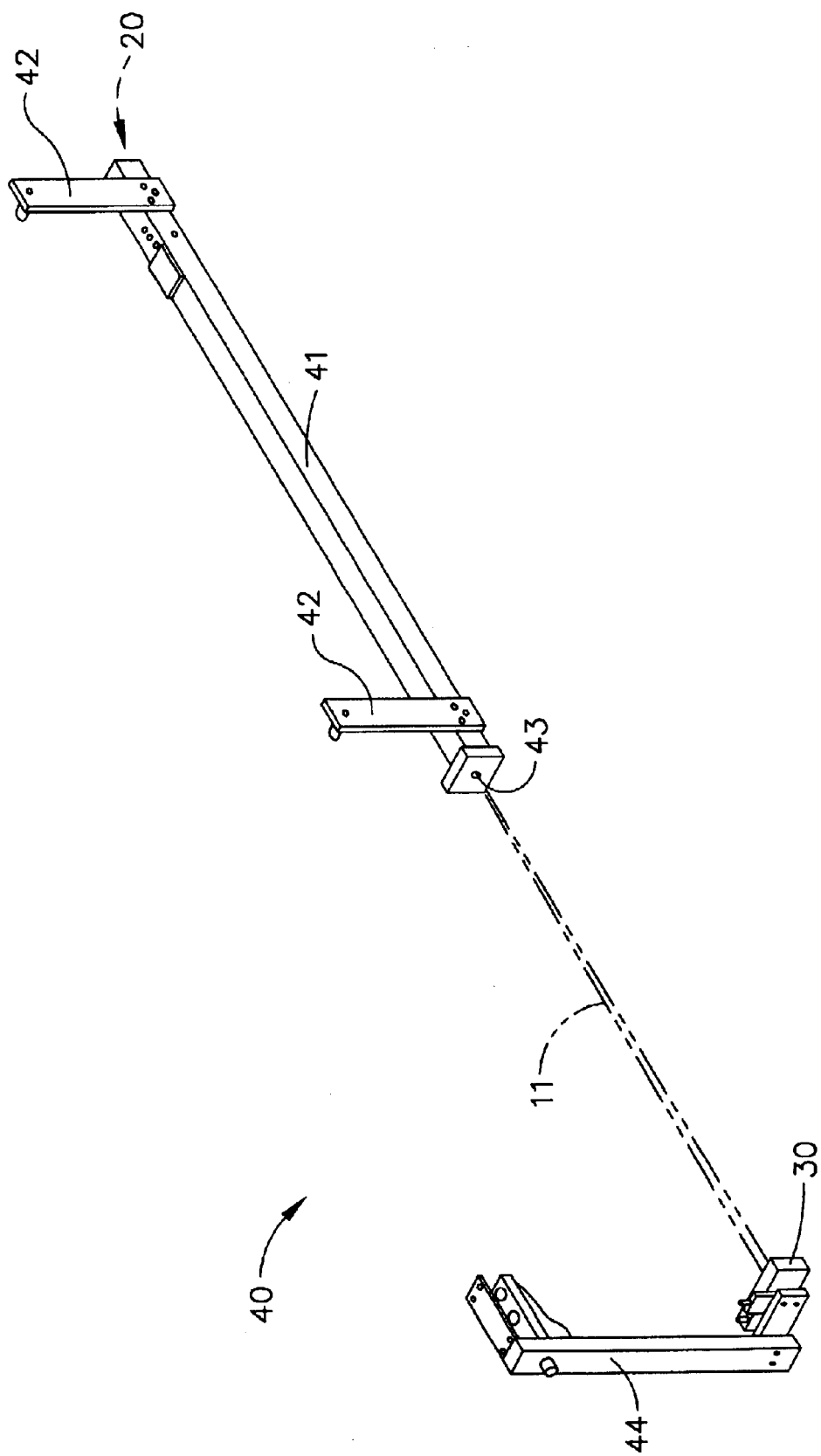
FIG. 4 is a perspective view of an implementation of the laser alignment tool according to one embodiment of the present invention.

Referring now to FIG. 4, an implementation 40 of the laser alignment tool 10 is illustrated according to one embodiment of the present invention. As shown in FIG. 4, the line laser assembly 20 (hidden from view) may be positioned inside a rigid enclosure 41. For example, the rigid enclosure 41 may be a square tube approximately 1.5 meters long. The rigid enclosure 41 may include clamps 42 or pads for mounting to a reference location 50. The rigid enclosure 41 may further include an adjustable aperture 43 installed opposite to the line laser assembly 20. For example, after the laser diode is aimed and/or calibrated, the adjustable aperture 43 can be adjusted to just bind the laser beam line 11, to help ensure that the laser beam remains aligned with respect to the rigid enclosure 41. The laser beam line 11 may be aimed through the adjustable aperture 43 and may be aligned using the adjustment screws 29 of the tilt stage 25 to exit the rigid enclosure 41. If the laser diode 21 is dropped or otherwise becomes misaligned with the rigid enclosure 41, the laser beam line 11 will not exit the aperture 43, and re-calibration becomes necessary. The rigid enclosure 41 can protect the line laser assembly 20, support the indexing of the laser diode 21, and help to keep the laser diode 21 positioned correctly. The electronic target assembly 30 may be attached to clamps 44 to be mounted on the part 60 to be aligned.

It should be understood, of course, that the foregoing relates to preferred embodiments of the invention and that modifications may be made without departing from the spirit and scope of the invention as set forth in the following claims.

We claim:

1. A laser alignment tool, comprising:
    a line laser assembly including a laser and a line-generating lens attached in front of the laser for causing the line laser assembly to emit a laser beam line; and
    an electronic target assembly including a photo detector array, wherein said laser beam line of said laser can be projected on a center of said photo detector array with a longitudinal axis of the projection of said laser beam line on the photo detector array being perpendicular to a centerline of said photo detector array.

2. The laser alignment tool of claim 1, also including a lens holder, wherein said laser comprises a laser diode and the line-generating lens is attached in front of the laser diode using the lens holder.

3. The laser alignment tool of claim 2, wherein said laser diode comprises a class I, II, or IIIa eye safe battery operated laser diode.

4. The laser alignment tool of claim 2, wherein said laser diode comprises a 658 nm collimated laser diode.

5. The laser alignment tool of claim 1, wherein said line laser assembly further comprises a tilt stage for adjusting a position of said laser.

6. The laser alignment tool of claim 5, wherein said tilt stage further comprises at least two fine threaded adjustment screws.

7. The laser alignment tool of claim 1, wherein said line laser assembly further comprises:
    a heat sink to divert heat from said laser; and
    a power supply module powered by a laser battery pack and controlled by an on/off toggle switch to provide power to said laser.

8. The laser alignment tool of claim 7, wherein said heat sink is custom-machined from an aluminum plate.

9. The laser alignment tool of claim 7, wherein said laser battery pack comprises four standard 1.5 Volt AA sized batteries.

10. The laser alignment tool of claim 1, wherein said electronic target assembly further comprises:
    a visual indication panel having an aperture and a discrete LED display;
    a narrow band pass filter positioned between said aperture of said visual indication panel and said photo detector array; and
    a programmable microprocessor being connected with said photo detector array and said discrete LED panel.

11. The laser alignment tool of claim 10, wherein said narrow band pass filter comprises a 650 nm narrow band pass filter.

12. The laser alignment tool of claim 10, wherein said discrete LED display comprises two converging rows of LEDs.

13. The laser alignment tool of claim 10, wherein said microprocessor is programmed with a variable range for each LED of said discrete LED display.

14. The laser alignment tool of claim 10, wherein said visual indication panel further comprises an audio source indicating convergence through differing tones.

15. The laser alignment tool of claim 1, wherein said electronic target assembly further comprises:

a battery pack controlled by an on/off toggle switch to supply power to said photo detector array, said microprocessor, and said discrete LED display; and a target housing enclosing said narrow band pass filter, said photo detector array, said microprocessor, and said battery pack.

16. The laser alignment tool of claim 15, wherein said battery pack comprises two standard 1.5 Volt AAA size batteries.

17. A laser alignment tool, comprising:

a line laser assembly including a laser and a line-generating lens attached in front of the laser for causing the line laser assembly to emit a laser beam line, wherein the laser and the lens are positioned inside a rigid enclosure mounted to a reference location; and an electronic target assembly for receiving said laser beam line having a target housing mounted to a part to be aligned, wherein the laser beam line can be projected on the target assembly with a longitudinal axis of the projection of said laser beam line on the target assembly being perpendicular to a centerline of said target assembly.

18. The laser alignment tool of claim 17, wherein the laser comprises a laser diode, the line-generating lens is attached in front of the laser diode using a lens holder, and said line laser assembly comprises:

a tilt stage for adjusting said laser diode;

a heat sink to divert heat from said laser diode; and a power supply module to provide power to said laser diode.

19. The laser alignment tool of claim 17, wherein said electronic target assembly comprises:

a photo detector array;

a visual indication panel having an aperture and a discrete LED display;

a narrow band pass filter positioned between said aperture of said visual indication panel and said photo detector array;

a programmable microprocessor being connected with said photo detector array and said discrete LED panel; and a battery pack to supply power to said photo detector array, said microprocessor, and said discrete LED display.

20. The laser alignment tool of claim 17, wherein said rigid enclosure comprises a square tube being about 1.5 meters long.

21. The laser alignment tool of claim 17, wherein said rigid enclosure further comprises clamps for mounting to said reference location.

22. The laser alignment tool of claim 17, wherein said rigid enclosure further comprises an adjustable aperture opposite to said line laser assembly.

23. The laser alignment tool of claim 17, wherein said target housing is mounted on a linear positioning stage.

24. A line laser assembly, comprising:

a tilt stage;

a laser diode mounted to said tilt stage;

a line-generating lens; and a lens holder positioning said line-generating lens in front of said laser diode in a position causing the line laser assembly to emit a laser beam line that can be projected on a target assembly with a longitudinal axis of the projection of said laser beam line on the target assembly being perpendicular to a centerline of said target assembly.

25. The line laser assembly of claim 24, wherein said laser diode comprises an eye safe battery operated 658 nm collimated laser diode.

26. The line laser assembly of claim 24, wherein said tilt stage is mounted on a linear positioning stage for adjusting said laser diode.

27. The line laser assembly of claim 24, further comprising:

a heat sink to divert heat from said laser diode; and a power supply module powered by a laser battery pack and controlled by an on/off toggle switch to provide power to said laser diode.

28. The line laser assembly of claim 27, wherein said heat sink is custom-machined from an aluminum plate and is used for mounting said laser diode on said tilt stage.

29. The line laser assembly of claim 27, wherein said laser battery pack comprises standard sized batteries.

30. An electronic target, comprising:

a visual indication panel having an aperture and a discrete LED display, wherein the discrete LED display includes at least one LED;

a photo detector array;

a narrow band pass filter positioned between said aperture of said visual indication panel and said photo detector array; and a programmable microprocessor being connected with said photo detector array and said discrete LED display.

31. The electronic target assembly of claim 30, wherein said narrow band pass filter comprises a 650 nm narrow band pass filter.

32. The electronic target assembly of claim 30, wherein said discrete LED display comprises at least one row of LEDs.

33. The electronic target assembly of claim 30, wherein said microprocessor is programmed according to engineering tolerance levels of a measurement task.

34. The electronic target assembly of claim 30, wherein said visual indication panel further comprises an audio source indicating convergence through differing tones.

35. The electronic target assembly of claim 30, further comprising a battery pack controlled by an on/off toggle switch to supply power to said photo detector array, said microprocessor, and said discrete LED display and a target housing enclosing said narrow band pass filter, said photo detector array, said microprocessor, and said battery pack.

36. The electronic target assembly of claim 35, wherein said battery pack comprises standard sized batteries.

37. A method for laser alignment, comprising the steps of:

providing a laser alignment tool including a line laser assembly and an electronic target assembly;

mounting said line laser assembly to a reference location;

programming a microprocessor with a variable range for each LED of a discrete LED display;

mounting said electronic target assembly to a part to be aligned;

operating the line laser assembly to generate a laser beam line and projecting the laser beam line on a center of a photo detector array with the longitudinal axis of the projection of said laser beam line on the photo detector array being perpendicular to a centerline of said photo detector array;

reading measurement results from said discrete LED display; and aligning said part to a required accuracy.

38. The method of claim 37, further comprising the steps of:

providing a rigid enclosure having clamps for mounting to said reference location;

positioning said line laser assembly inside said rigid enclosure; and mounting said rigid enclosure to said reference location.

39. The method of claim 37, further comprising a step of attaching a line-generating lens in front of a laser diode using a lens holder for emitting said laser beam line.

40. The method of claim 37, further comprising a step of adjusting said laser beam line using a tilt stage.

41. The method of claim 37, further comprising a step of providing a discrete LED display having two converging rows of LEDs.

42. The method of claim 37, further comprising a step of providing an audio source indicating convergence through differing tones.

* * * * *